Patented Apr. 30, 1929.

1,710,992

UNITED STATES PATENT OFFICE.

GEORG KRÄNZLEIN AND MARTIN CORELL, OF HOCHST-ON-THE-MAIN, GERMANY, ASSIGNORS TO GRASSELLI DYESTUFF CORPORATION, OF NEW YORK, N. Y., A CORPORATION OF DELAWARE.

CONDENSATION PRODUCTS OF THE ANTHRAQUINONE SERIES AND PROCESS OF MAKING SAME.

No Drawing. Application filed December 15, 1926, Serial No. 155,099, and in Germany December 17, 1925.

Our present invention relates to the preparation of condensation products of the anthraquinone series containing nitrogen.

By the researches of Gattermann (see Annalen der Chemie, vol. 393, page 144) it has been disclosed that anthraquinone mercaptans can be subjected to reaction with alkylene halogenides such as for instance ethylene bromide. In German Patents Nos. 249.225 and 253.507 are described methods for preparing vat dyestuffs of the anthraquinone series by a similar reaction between anthraquinone mercaptans and alkylene halogenides which do not contain any alkali-soluble group. The products obtained by the above mentioned reactions have proved to be of no technical value.

Now we have found that valuable reaction products can be obtained by subjecting a compound of the following composition:

wherein A stands for an anthraquinone residue, which may be substituted, and R stands for hydrogen or an alkali metal, the $NH_2$ and SR groups standing in ortho-position to each other and in an α- and β-position,—and when R represents hydrogen in the presence of an acid binding agent to reaction with bodies of the following constitution:

$$Hlg.CH_2.CH_2.X$$

wherein Hlg stands for a halogen-atom and X represents a halogen or hydroxyl.

If sodium 1-amino-2-anthraquinone mercaptan is taken as an example the reaction takes place in the following sense:

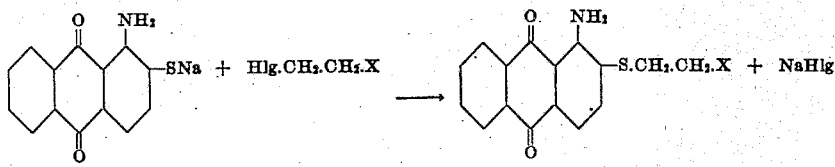

The bodies obtainable by our above new process are not only valuable intermediate products, but they can be directly used as dyestuffs for dyeing acetate silk.

The following examples illustrate our invention but they are not intended to limit it thereto; all parts being by weight.

(1) 100 parts of an aqueous paste of about 60% strength of sodium 1-aminoanthraquinone-2-mercaptan are suspended in 1000 parts of water and there are then added 60 parts of ethylenechlorhydrin (35%). After having heated the mass on the water bath for a short time it is allowed to cool and is filtered by suction. After recrystallization from alcohol, the resulting 1-amino-anthraquinone-2-(omega-hydroxy)-ethylthioether shows a melting point of 171–173° C. and dissolves in sulfuric acid of 66° Bé. with a red color.

(2) 12 parts of sodium 1.4-diamino anthraquinone-2.chlor-3-mercaptan produced according to German Patent No. 204.772 by acting upon 1.4-diamino-2.3-dichloranthraquinone with alkali sulfide, are heated on the water bath with 100 parts of water and 20 parts of ethylenechlorhydrin and the reaction product, which soon separates, is filtered by suction. It constitutes a blue body which dissolves in sulfuric acid of 66° Bé. to a yellow solution.

(3) 19 parts of sodium 1-amino-4-paratolylamino-anthraquinone-2-mercaptan (produced from 1-amino-4-para-toluido-2-bromanthraquinone by reaction with sodium sulfide), are heated on the water bath together with 200 parts of alcohol, 200 parts of water and 30 parts of ethylenechlorhydrin (35%). After 3 hours, the mass is allowed to cool and then filtered by suction. The product crystallizes from toluene in the form of needles having a bronze-like luster. It is soluble in sulfuric acid to a greyish-blue solution.

(4) 100 parts of sodium 1-aminoanthraquinone-2-mercaptan are suspended in 500 parts of water and 500 parts of alcohol and to this suspension are added 20 parts of ethylene bromide. After having heated the mass for a short time on the water bath, it is allowed to cool and is filtered by suction. The resulting 1-amino-anthraquinone-2-(omega-bromo)-ethylthioether melts at 145–147° C.

(5) A mixture of 24 parts of sodium-1-amino-4-tolylamino-2-anthraquinonemercaptan, (produced in the usual manner from 1-amino-4-tolylamino-2-bromanthraquinone), 200 parts of water, 200 parts of alcohol and 20 parts of ethylenebromide is heated on the water bath for three hours under reflux and while stirring. The isolated 1-amino-4-(p-tolyl)-amino-anthraquinone-2-(omega-bromo)-ethylthioether forms a blue crystalline powder which dissolves in sulfuric acid to a bluish violet solution.

In an analogous manner the sodium salts of ortho-mercaptan, obtainable according to German Patent No. 290.084 from 1.5- and 1.8-diaminoanthraquinone and 1.4.5.8-tetra-aminoanthraquinone can be subjected to reaction with halogenhydrins or halogenethylenes.

In quite the same manner react the 2.6-diaminoanthraquinone-1.5-dimercaptan and the 2.7-diaminoanthraquinone-1.8-dimercaptan described respectively in Example 1 and Example 4 of German Patent No. 260.905; the 2-amino-3-bromanthraquinone-1-mercaptan obtainable according to German Patent No. 204.772 from dibromaminoanthraquinone and many others.

Instead of ethylenechlorhydrin there may in all of the foregoing examples also be used propylenechlorhydrin, glycerine-monochlorhydrin or the like.

We claim:

1. The process for preparing condensation products of the anthraquinone series containing nitrogen which comprises subjecting a compound of the following composition:

wherein A stands for an anthraquinone residue, which may be substituted, and R stands for an alkali metal, and the NH₂ and SR groups are in ortho-position to each other and in α- and β-position in the anthraquinone nucleus, to reaction with substances of the following formula:

Hlg.CH₂.CH₂.X, wherein Hlg represents a halogen atom and X a halogen atom or an OH-group.

2. The process for preparing condensation products of the anthraquinone series containing nitrogen, which comprises subjecting a compound of the following composition:

wherein A stands for an anthraquinone residue, which may be substituted, and R stands for an alkali metal, and the NH₂ and SR groups are in ortho-position to each other and in α- and β-position in the anthraquinone nucleus, to reaction with ethylene halogen hydrine.

3. The process for preparing condensation products of the anthraquinone series containing nitrogen, which comprises subjecting a compound of the following composition:

wherein A stands for an anthraquinone residue, which may be substituted, and R stands for an alkali metal, and the NH₂ and SR groups are in ortho-position to each other and in α- and β-position in the anthraquinone nucleus, to reaction with ethylene chlorhydrine.

4. As new products, compounds of the following composition:

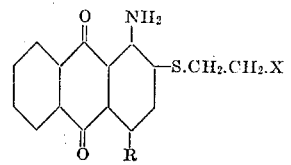

wherein X stands for a halogen or an OH-group and R stands for hydrogen or the —NHC₆H₄CH₃ group, said products being blue vat-dyestuffs, yielding when crystallized from an indifferent solvent, crystals with a bronze-like luster.

5. As new products, compounds of the following composition:

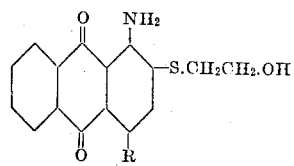

wherein R stands for hydrogen or

—NH.C₆H₄.CH₃;

said products being blue vat-dyestuffs, yielding when crystallized from an indifferent solvent, crystals with a bronze-like luster.

6. As a new product, the compound of the following composition:

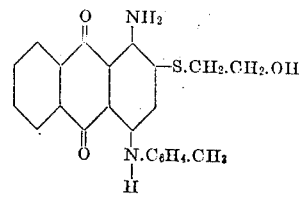

said compound being soluble in sulfuric acid to a greyish-blue solution, forming, after recrystallization from toluene, needles having a bronze-like luster and melting at 154° C. to 156° C.

In testimony whereof, we affix our signatures.

GEORG KRÄNZLEIN.
MARTIN CORELL.